United States Patent
Kim et al.

(10) Patent No.: US 9,897,841 B2
(45) Date of Patent: Feb. 20, 2018

(54) DISPLAY DEVICE COMPRISING A PLURALITY OF MICROCAVITIES AND A ROOF LAYER HAVING A PARTITION WALL PORTION BETWEEN THE PLURALITY OF MICROCAVITIES

(71) Applicant: Samsung Display Co., Ltd., Yongin (KR)

(72) Inventors: Yu Jin Kim, Hwaseong-si (KR); Won Tae Kim, Suwon-si (KR); Kyung Tae Chae, Hwaseong-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 108 days.

(21) Appl. No.: 14/595,951

(22) Filed: Jan. 13, 2015

(65) Prior Publication Data
US 2015/0378208 A1    Dec. 31, 2015

(30) Foreign Application Priority Data

Jun. 30, 2014    (KR) ........................ 10-2014-0080570

(51) Int. Cl.
*G02F 1/1362*    (2006.01)
*G02F 1/1343*    (2006.01)
*G02F 1/1341*    (2006.01)
*G02F 1/1333*    (2006.01)

(52) U.S. Cl.
CPC ...... *G02F 1/133377* (2013.01); *G02F 1/1341* (2013.01); *G02F 1/136286* (2013.01); *G02F 1/136213* (2013.01); *G02F 2001/134345* (2013.01)

(58) Field of Classification Search
CPC . G02F 1/1339; G02F 1/1362; G02F 1/133377
See application file for complete search history.

(56) References Cited

U.S. PATENT DOCUMENTS

| | | | |
|---|---|---|---|
| 2013/0093985 A1* | 4/2013 | Kang ................ | G02F 1/133377 349/106 |
| 2014/0009709 A1* | 1/2014 | Lim .................. | G02F 1/136286 349/43 |
| 2014/0160395 A1* | 6/2014 | Park ................... | G02B 27/2214 349/61 |
| 2014/0293205 A1 | 10/2014 | Kim et al. | |

FOREIGN PATENT DOCUMENTS

| | | |
|---|---|---|
| KR | 10-2012-0026880 | 3/2012 |
| KR | 10-2013-0134153 | 10/2013 |

* cited by examiner

*Primary Examiner* — Paul Lee
(74) *Attorney, Agent, or Firm* — H.C. Park & Associates, PLC

(57) ABSTRACT

A display device includes a substrate, a thin film transistor, a pixel electrode, a roof layer, a plurality of microcavities, a groove, liquid crystal molecules, and an encapsulation layer. The thin film transistor is disposed on the substrate. The pixel electrode is connected to the thin film transistor. The roof layer is disposed on the pixel electrode so as to be spaced apart from the pixel electrode while interposing the plurality of microcavities. The groove is formed in a first surface of the roof layer. The liquid crystal molecules are disposed in the microcavities. The encapsulation layer is disposed on the roof layer and seals the liquid crystal molecules in the microcavities.

8 Claims, 15 Drawing Sheets

DISPLAY DEVICE COMPRISING A PLURALITY OF MICROCAVITIES AND A ROOF LAYER HAVING A PARTITION WALL PORTION BETWEEN THE PLURALITY OF MICROCAVITIES

CROSS-REFERENCE TO RELATED APPLICATION

This application claims priority from and the benefit of Korean Patent Application No. 10-2014-0080570, filed on Jun. 30, 2014, which is hereby incorporated by reference for all purposes as if set forth herein.

BACKGROUND

Field

Exemplary embodiments relate to a display device and a manufacturing method thereof, and, more particular, to a display device and a manufacturing method thereof to prevent (or otherwise reduce) an error that may be generated in the manufacturing process.

Discussion

Conventional liquid crystal displays typically include two display panels with field generating electrodes disposed thereon (such as one or more pixel and common electrodes), and a liquid crystal layer disposed between the display panels. Traditionally, a liquid crystal display will generate an electric field in the liquid crystal layer by applying a voltage to one or more of the field generating electrodes, which controls the alignment of liquid crystal molecules of the liquid crystal layer. This also controls polarization of incident light, and, thereby, enables the display of an image.

The two display panels may include a thin film transistor array panel and an opposing display panel. The thin film transistor array panel may include a gate line transferring a gate signal and a data line transferring a data signal formed to cross each other, and a thin film transistor connected to the gate line and the data line. The thin film transistor array panel may further include a pixel electrode connected to the thin film transistor. The opposing display panel may include a light blocking member, a color filter, and a common electrode. It is noted that the light blocking member, the color filter, and the common electrode may be formed on the thin film transistor array panel. Typically, formation of the two display panels is accomplished utilizing two respective substrates. In this manner, the respective constituent elements may be formed on the two substrates, and, as a result, the display device may be relatively heavy and thick, as well as cost more and require a longer processing time.

The above information disclosed in this Background section is only for enhancement of understanding of the background of the inventive concept, and, therefore, it may contain information that does not form the prior art that is already known in this country to a person of ordinary skill in the art.

SUMMARY

Exemplary embodiments provide a display device and a manufacturing method thereof to reduce weight, thickness, cost, and processing time via utilization of one substrate.

Additional aspects will be set forth in the detailed description which follows, and, in part, will be apparent from the disclosure, or may be learned by practice of the inventive concept.

According to exemplary embodiments, a display device includes a substrate, a thin film transistor, a pixel electrode, a roof layer, a plurality of microcavities, a groove, liquid crystal molecules, and an encapsulation layer. The thin film transistor is disposed on the substrate. The pixel electrode is connected to the thin film transistor. The roof layer is disposed on the pixel electrode so as to be spaced apart from the pixel electrode while interposing the plurality of microcavities. The groove is formed in a first surface of the roof layer. The liquid crystal molecules are disposed in the microcavities. The encapsulation layer is disposed on the roof layer and seals the liquid crystal molecules in the microcavities.

According to exemplary embodiments, a method for manufacturing a display device includes: forming a pixel electrode on a substrate; forming a sacrificial layer on the pixel electrode; forming a roof layer on the sacrificial layer; forming an injection hole in the roof layer, the injection hole exposing a portion of the sacrificial layer; forming a groove in a first surface of the roof layer; removing the sacrificial layer to form a plurality of microcavities between the pixel electrode and the roof layer; injecting, via the injection hole, liquid crystal molecules into the microcavities; and forming an encapsulation layer on the roof layer, the encapsulation layer covering the injection hole to seal the liquid crystal molecules in the microcavities.

According to exemplary embodiments, fabrication errors may be prevented (or otherwise reduced) that would otherwise be generated due to gas discharge from an organic film during a high temperature fabrication process.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concept, and are incorporated in and constitute a part of this specification, illustrate exemplary embodiments of the inventive concept, and, together with the description, serve to explain principles of the inventive concept.

DETAILED DESCRIPTION OF THE ILLUSTRATED EMBODIMENTS

Figure 1:
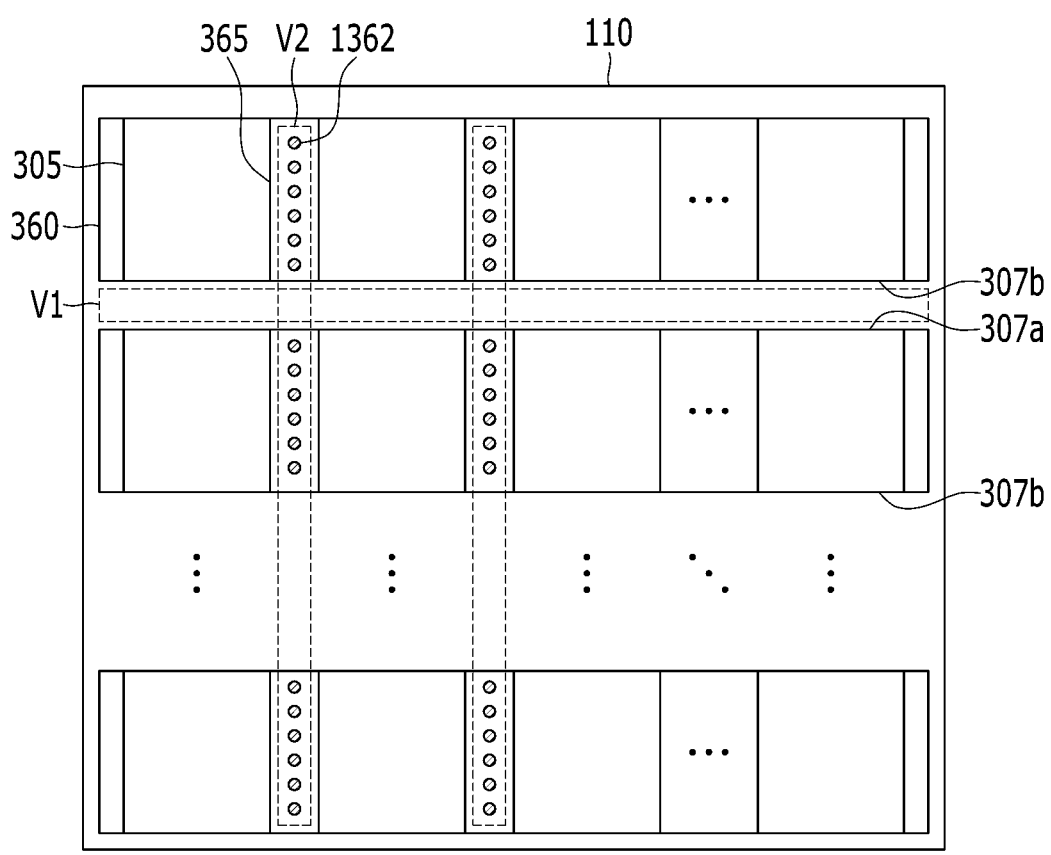
FIG. 1 is a plan view of a display device, according to exemplary embodiments.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Various exemplary embodiments are described herein with reference to sectional illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the drawings are schematic in nature and their shapes are not intended to illustrate the actual shape of a region of a device and are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

A display device according to exemplary embodiments will now be described with reference to FIGS. 1-5.

Figure 2:
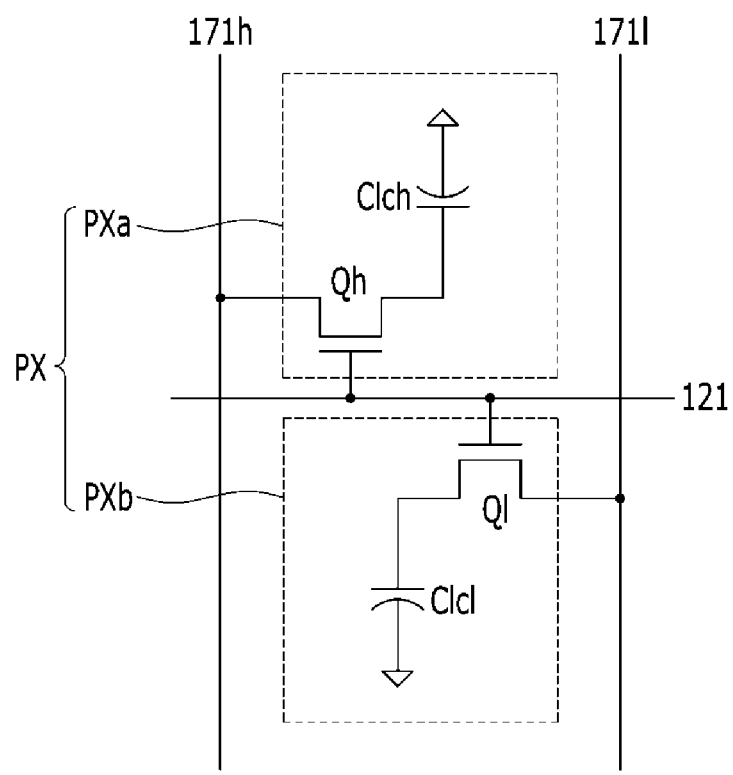
FIG. 2 is an equivalent circuit diagram of a pixel of the display device of FIG. 1, according to exemplary embodiments.
Figure 3:
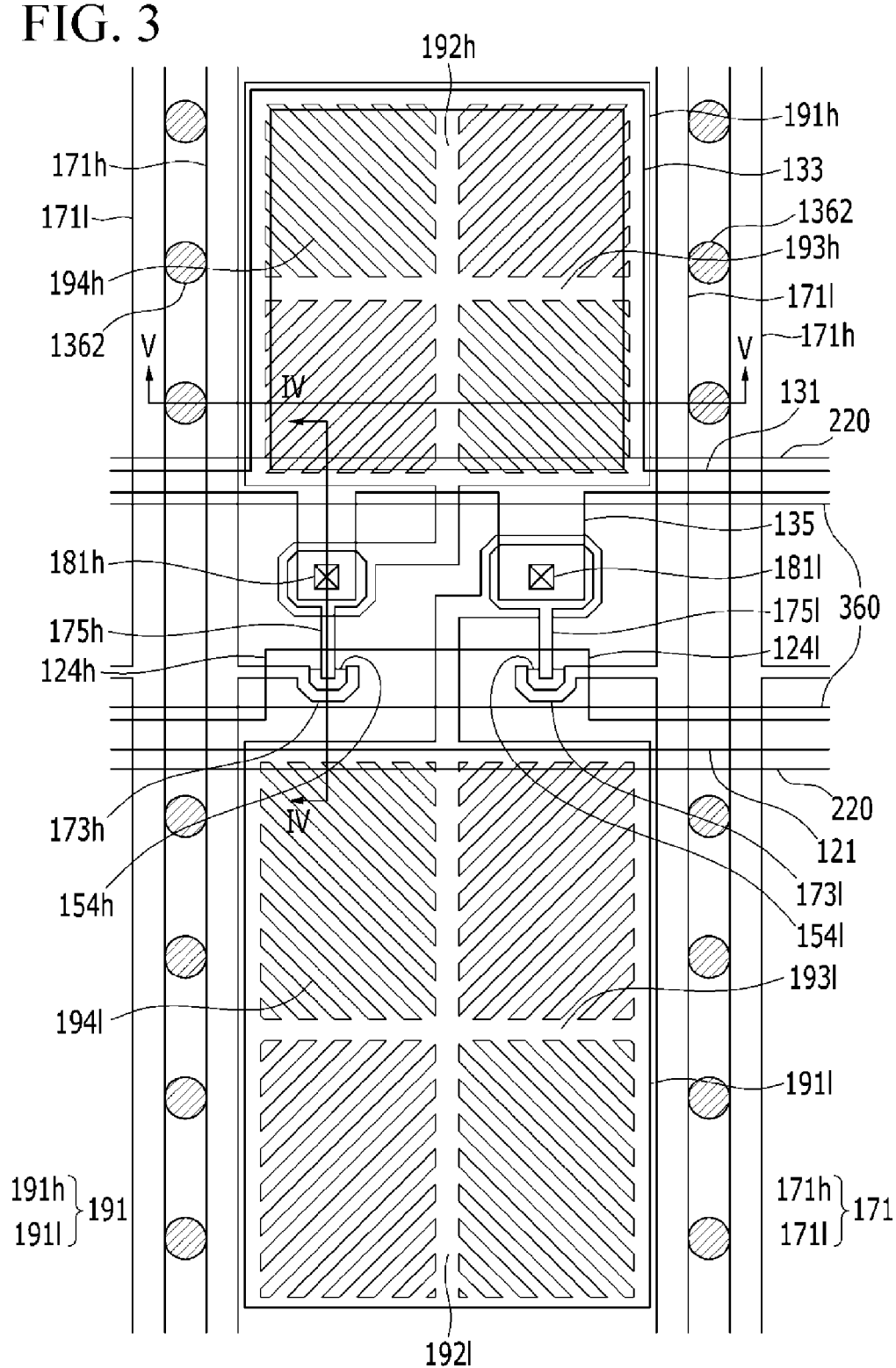
FIG. 3 is a plan view of a pixel of the display device of FIG. 1, according to exemplary embodiments.
Figure 4:
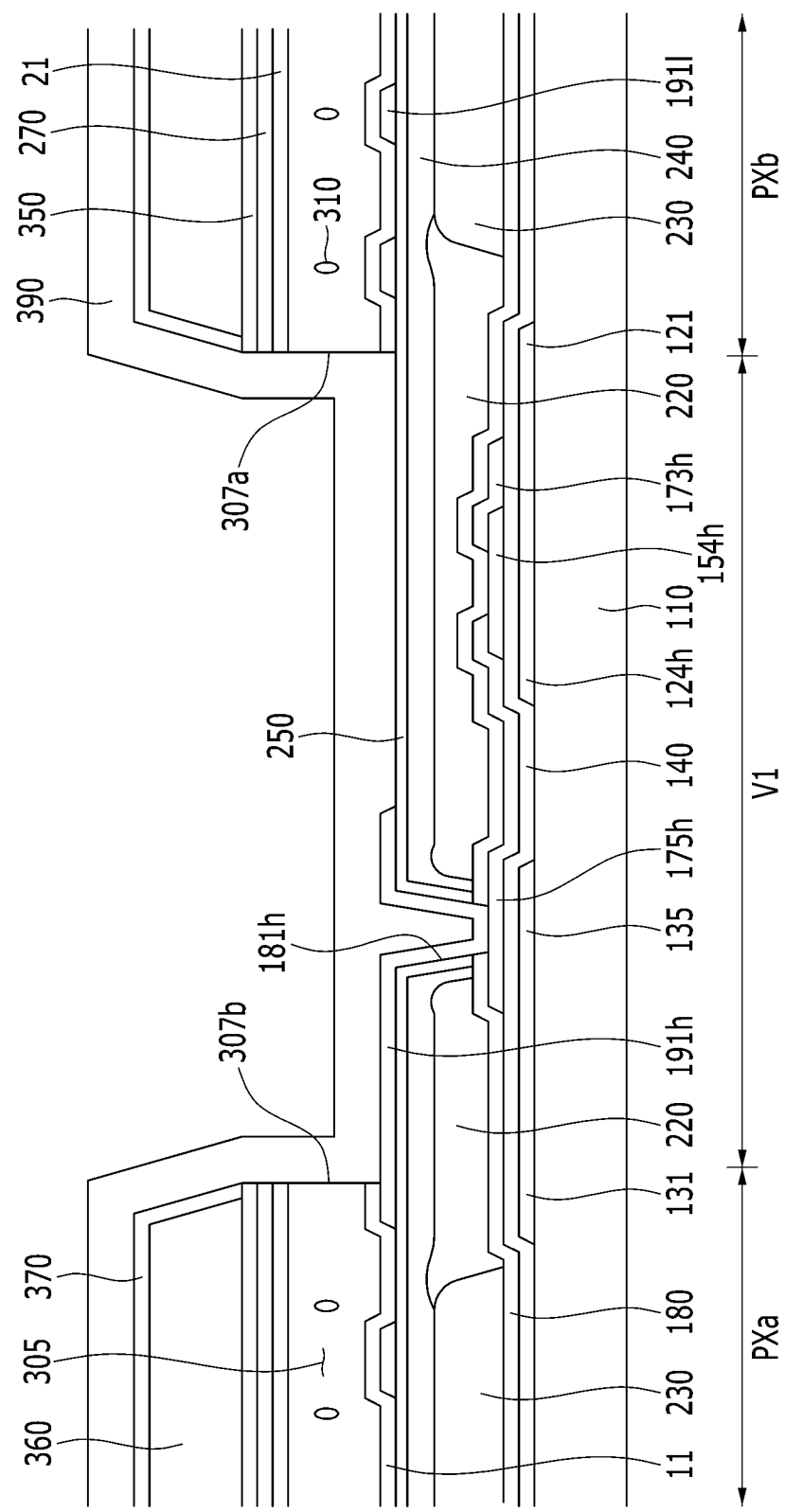
FIG. 4 is a cross-sectional view of the display device of FIG. 3 taken along sectional line IV-IV, according to exemplary embodiments.
Figure 5:
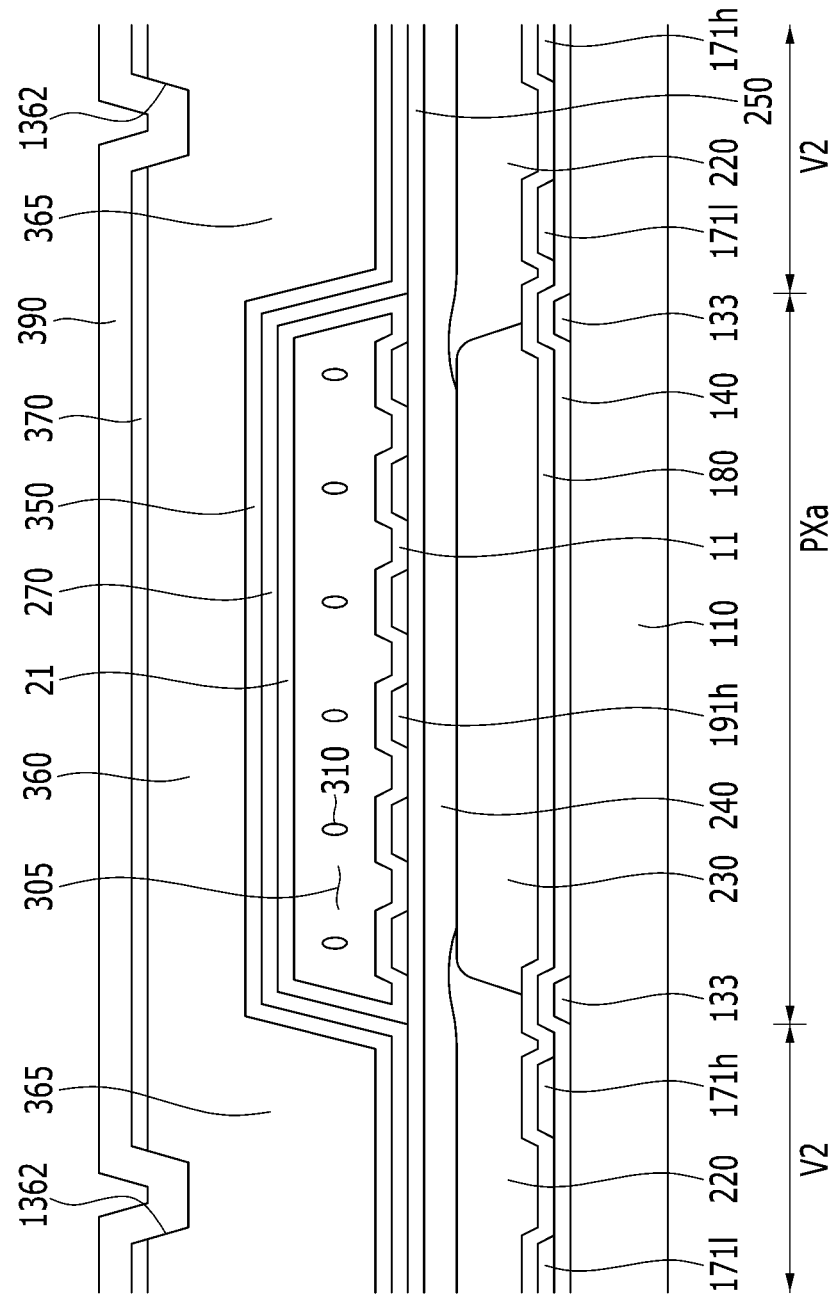
FIG. 5 is a cross-sectional view taken of the display device of FIG. 3 taken along sectional line V-V, according to exemplary embodiments.

FIG. 1 is a plan view of a display device, according to the exemplary embodiments. FIG. 2 is an equivalent circuit diagram of a pixel of the display device of FIG. 1, according to exemplary embodiments. FIG. 3 is a plan view of a pixel of the display device of FIG. 1, according to exemplary embodiments. FIG. 4 is a cross-sectional view of the display device of FIG. 3 taken along sectional line IV-IV. FIG. 5 is a cross-sectional view taken of the display device of FIG. 3 taken along sectional line V-V.

The display device may include a substrate 110, which may be made of any suitable material, such as glass, plastic, etc.

A plurality of microcavities 305 covered by a plurality of roof layers 360 may be formed on the substrate 110. The roof layers 360 may extend in a first (e.g., row) direction, and the microcavities 305 of a same row may be formed under the same roof layer 360. The microcavities 305 may be arranged in any suitable formation (e.g., a matrix formation). First valleys V1 may be formed between microcavities 305 adjacently arranged in the row direction, and second valleys V2 may be formed between microcavities 305 adjacently arranged in a column direction.

The roof layers 360 may be separated (e.g., spaced apart) from each other with the first valleys V1 disposed between adjacent roof layers 360. In other words, the roof layers 360 may be removed between the microcavities 305 that are vertically arranged. The microcavities 305 may not be covered by the roof layers 360, and, thereby, exposed in a portion contacting the first valleys V1. These portions may be referred to as injection holes 307a and 307b.

The injection holes 307a and 307b may be formed at opposite edges of each of the microcavities 305. The injection holes 307a and 307b may include a first injection hole 307a and a second injection hole 307b. The first injection hole 307a may be formed to expose a side surface of a first edge of each of the microcavities 305, and the second injection hole 307b may be formed to expose a side surface of a second edge of each of the microcavities 305. Each of the microcavities 305 may have a first edge and a second edge, of which side surfaces thereof face each other.

Each roof layer 360 may be formed between adjacent second valleys V2 and may be spaced apart from the substrate 110 to form the microcavities 305. In other words, the roof layers 360 may be formed to cover the remaining side surfaces, except the side surfaces of the first edge and the second edge in which the injection holes 307a and 307b may be formed. As such, the roof layers 360 may include partition walls 365 that may be formed between the microcavities 305. The partition walls 365 may be formed between horizontally adjacent microcavities 305, e.g., at sides of the respective second valleys V2.

A groove 1362 may be formed on a top surface of each of the roof layers 360. The groove 1362 may be formed on a top surface of each of the partition walls 365. In this manner, the groove 1362 may be formed at each of the second valleys V2. Each groove 1362 may be formed having any suitable cross-sectional shape, and may include a plurality of grooves that may be separately disposed at a predetermined interval, such as a plurality of circular grooves disposed in grooves 1362. It is noted that the plurality of grooves in grooves 1362 may have any other suitable shape.

Although specific reference will be made to the configuration of the display device of FIG. 1, it is contemplated that the display device may include various modifications or other configurations. For example, an arrangement of the microcavities 305, the first valleys V1, and the second valleys V2 may be altered, the roof layers 360 may be connected to each other in the first valleys V1, and/or a part of each roof layer 360 may be spaced apart from the substrate 110 in the second valleys V2, and, thereby, connect adjacent microcavities 305 to each other.

An exemplary pixel of the display device of FIG. 1 will now be described with reference to FIG. 2.

According to exemplary embodiments, the display device may include a plurality of signal lines 121, 171h, and 171l, and a plurality of pixels PX connected to the signal lines 121, 171h, and 171l. The pixels PX may be arranged in any suitable formation, e.g., a matrix formation including a plurality of pixel rows and a plurality of pixel columns. Each pixel PX may include a first sub-pixel PXa and a second sub-pixel PXb. The first sub-pixel PXa and the second sub-pixel PXb may be disposed vertically adjacent to one another; however, any other suitable configuration may be utilized in association with exemplary embodiments described herein. The first valleys V1 may extend in the first direction between the first sub-pixel PXa and the second sub-pixel PXb, and the second valleys V2 may extend in the second direction between the columns of pixels. The signal lines 121, 171h, and 171l may include a gate line 121 for transmitting a gate signal, and a first data line 171h and a second data line 171l for transmitting different data voltages.

According to exemplary embodiments, the pixel PX may include a first switching element Qh connected to the gate line 121 and the first data line 171h, and a second switching element Ql connected to the gate line 121 and the second data line 171l. A first liquid crystal capacitor Clch may be connected to the first switching element Qh, and may be formed in the first sub-pixel PXa. A second liquid crystal capacitor Clcl may be connected to the second switching element Ql and may be formed in the second sub-pixel PXb.

A first terminal of the first switching element Qh may be connected to the gate line 121, a second terminal may be connected to the first data line 171h, and a third terminal may be connected to the first liquid crystal capacitor Clch. A first terminal of the second switching element Ql may be connected to the gate line 121, a second terminal may be connected to the second data line 171l, and a third terminal may be connected to the second liquid crystal capacitor Clcl.

An exemplary operation of the display device of FIG. 1 will now be described with reference to FIG. 2.

When a gate-on voltage is applied to the gate line 121, the first switching element Qh and the second switching element Ql connected to the gate line 121 may enter a turn-on state, and the first and second liquid crystal capacitors Clch and Clcl may be charged by different data voltages transmitted through the first and second data lines 171h and 171l. The data voltage transmitted by the second data line 171l may be lower than the data voltage transmitted by the first data line 171h. In this manner, the second liquid crystal capacitor Clcl may be charged with a lower voltage than the first liquid crystal capacitor Clch, which may improve side visibility, e.g., improve a lateral viewing angle of the display device.

An exemplary structure of a pixel of the liquid crystal display of FIG. 1 will now be described with reference to FIGS. 3-5.

Referring to FIGS. 3-5, the gate line 121 and a first gate electrode 124h and a second gate electrode 124l protruding from the gate line 121 may be formed on the substrate 110. The gate line 121 may extend in the first (e.g., row or horizontal) direction, and may transmit a gate signal. The gate line 121 may be positioned between two microcavities 305, which may be adjacent to one another in the second (e.g., column or vertical) direction. It is also contemplated that the gate line 121 may be positioned at (or in) the first valleys V1. The first gate electrode 124h and the second gate electrode 124l may protrude in an upward direction at an upper side of the gate line 121. The first gate electrode 124h and the second gate electrode 124l may be connected to each other to form one protrusion. It is contemplated, however, that exemplary embodiments are not limited thereto, and the protruding form of the first gate electrode 124h and the second gate electrode 124l may be modified, e.g., formed in any suitable manner.

A storage electrode line 131 and storage electrodes 133 and 135 protruding from the storage electrode line 131 may be further formed on the substrate 110. The storage electrode line 131 may extend in a direction parallel (or substantially parallel) to the gate line 121, and may be spaced apart from the gate line 121. A constant voltage may be applied to the storage electrode line 131. The storage electrode 133 may protrude from the storage electrode line 131 and may be formed to enclose an edge of the first sub-pixel area PXa. The storage electrode 135 may protrude under the storage electrode line 131 and may be formed adjacent to the first gate electrode 124h and the second gate electrode 124l.

A gate insulating layer 140 may be formed on the gate line 121, the first gate electrode 124h, the second gate electrode 124l, the storage electrode line 131, and the storage electrode 135. The gate insulating layer 140 may be formed of any suitable material, such as, for example, an inorganic insulating material, e.g., silicon nitride (SiNx), silicon oxide (SiOx), etc. The gate insulating layer 140 may be formed of a single layer or a multilayer.

A first semiconductor 154h and a second semiconductor 154l may be formed on the gate insulating layer 140. The first semiconductor 154h may be positioned on the first gate electrode 124h, and the second semiconductor 154l may be positioned on the second gate electrode 124l. The first semiconductor 154h may be elongated under the first data line 171h, and the second semiconductor 154l may be elongated under the second data line 171l. The first semiconductor layer 154h and the second semiconductor 154l may be formed of any suitable material, such as, for example, amorphous silicon, polycrystalline silicon, a metal oxide, etc.

An ohmic contact member (not illustrated) may be formed on each of the first semiconductor 154h and the second semiconductor 154l. The ohmic contact members may be made of any suitable material, such as, for example, silicide, a material such as n+ hydrogenated amorphous silicon on which an n-type impurity may be doped at a high concentration, etc.

The first data line 171h, the second data line 171l, a first source electrode 173h, a first drain electrode 175h, a second source electrode 173l, and a second drain electrode 715l may be formed on the first semiconductor 154h, the second semiconductor 154l, and the gate insulating layer 140. The first data line 171h and the second data line 171l may transfer a data signal, and may extend in the second (e.g., vertical) direction to cross the gate line 121 and the storage electrode line 131. The data lines 171h and 171l may be positioned between the two microcavities 305, which may be adjacent to one another in the first (e.g., horizontal) direction. In this manner, the data lines 171h and 171l may be positioned in the second valleys V2. The first data line 171h and the second data line 171l may transmit different data voltages. The data voltage transmitted by the second data line 171l may be lower than the data voltage transmitted by the first data line 171h.

The first source electrode 173h may be formed to upwardly protrude from the first gate electrode 124h and from the first data line 171h. The second source electrode 173l may be formed to upwardly protrude from the second gate electrode 124l and from the second data line 171l. Each of the first drain electrode 175h and the second drain electrode 715l may have one wide end portion and the other end portion may be a rod-shaped end portion. The wide end portions of the first drain electrode 175h and the second drain electrode 715l may overlap the storage electrode 135, which may downwardly protrude from the storage electrode line 131. Each of the rod-shaped end portions of the first drain electrode 175h and the second drain electrode 715l may be partially surrounded by the first source electrode 173h and the second source electrode 173l. It is contemplated, however, that the shape of the end portions of the first and second drain electrodes 175h and 715l may be formed in any other suitable shape.

The first and second gate electrodes 124h and 124l, the first and second source electrodes 173h and 173l, and the first and second drain electrodes 175h and 715l may form first thin film transistor (TFT) Qh and second TFT Ql together with the first and second semiconductors 154h and 154l. Channels of the thin film transistors Qh and Ql may be formed in the semiconductors 154h and 154l between the source electrodes 173h and 1781 and the drain electrodes 175h and 715l, respectively.

A passivation layer 180 may be formed on the first semiconductor 154h exposed between the first source electrode 173h and the first drain electrode 175h, as well as disposed on the first data line 171h, the second data line 171l, the first source electrode 173h, and the first drain electrode 175h. The passivation layer 180 may also be disposed on the second semiconductor 154l exposed between the second source electrode 173l and the second drain electrode 715l, as well as disposed on the second source electrode 173l, and the second drain electrode 715l. The passivation layer 180 may be formed of any suitable material, such as, for example, an organic insulating material, an inorganic insulating material, etc. To this end, the passivation layer 180 may be formed of a single layer or a multilayer.

A color filter 230 may be formed in each pixel PX region on the passivation layer 180. Each color filter 230 may display any one of, for example, the primary colors, such as a red color, a green color, and a blue color. The color filters 230, however, may not be limited to the red color, the green color, and the blue color, and may display any other suitable color, such as, for instance, a cyan color, a magenta color, a yellow color, a white-based color, etc. The color filters 230 may not be formed in the first valleys V1.

A light blocking member 220 may be formed in a region between adjacent color filters 230. The light blocking member 220 may be formed on a boundary of a pixel PX and an associated thin film transistor to prevent light leakage between pixels PX. It is noted that the light blocking member 220 may be formed in the first valleys V1 and the second valleys V2. It is also noted that the color filters 230 and the light blocking member 220 may partially overlap each other.

A first insulating layer 240 may be further formed on the color filters 230 and the light blocking member 220. The first insulating layer 240 may be formed of any suitable material, such as, for example, an organic insulating material, and may serve to planarize the color filters 230. The first insulating layer 240 may be omitted. A second insulating layer 250 may be formed on the first insulating layer 240. The second insulating layer 250 may be formed of any suitable material, such as, for instance, an inorganic insulating material, and may serve to protect the color filters 230 and the first insulating layer 240. The second insulating layer 250 may be omitted.

A first contact hole 181h through which the wide end portion of the first drain electrode 175h is exposed, and a second contact hole 181l through which the wide end portion of the second drain electrode 715l is exposed may be formed in the passivation layer 180, the first insulating layer 240, and the second insulating layer 250.

A pixel electrode 191 may be formed on the second insulating layer 250. The pixel electrode 191 may be formed of any suitable transparent conductive material, such as, for example, aluminum zinc oxide (AZO), gallium zinc oxide (GZO), indium tin oxide (ITO), indium zinc oxide (IZO), etc. It is also contemplated that one or more conductive polymers (ICP) may be utilized, such as, for example, polyaniline (PANI), poly(3,4-ethylenedioxythiophene)poly (styrenesulfonate) (PEDOT:PSS), etc.

The pixel electrode 191 may include a first sub-pixel electrode 191h and a second sub-pixel electrode 191l, which may be separated from each other with the gate line 121 and the storage electrode line 131 disposed between the gate line 121 and the second sub-pixel electrode 191l. The first sub-pixel electrode 191h and the second sub-pixel electrode 191l may be disposed on and under the pixel PX based on the gate line 121 and the storage electrode line 131. In this manner, the first sub-pixel electrode 191h and the second sub-pixel electrode 191l may be separated from each other with the first valleys V1 disposed between the first sub-pixel electrode 191h and the second sub-pixel electrode 191l, and the first sub-pixel electrode 191h may be positioned in the first sub-pixel PXa and the second sub-pixel electrode 191l is positioned in the second sub-pixel PXb.

The first sub-pixel electrode 191h may be connected to the first drain electrode 175h through the first contact hole 181h, and the second sub-pixel electrode 191l may be connected to the second drain electrode 715l through the second contact hole 181l. In this manner, when the first thin film transistor Qh and the second thin film transistor Ql are in an on-state, the first sub-pixel electrode 191h and the second sub-pixel electrode 191l may receive different data voltages from the first drain electrode 175h and the second drain electrode 715l, respectively. An electric field may be formed between the pixel electrode 191 and a common electrode 270.

A general shape of each of the first sub-pixel electrode 191h and the second sub-pixel electrode 191l may be a quadrangle, and the first sub-pixel electrode 191h and the second sub-pixel electrode 191l may include cross-shaped stem portions formed by horizontal stem portions 193h and 193l and vertical stem portions 192h and 192l crossing the horizontal stem portions 193h and 193l. Further, each of the first sub-pixel electrode 191h and the second sub-pixel electrode 191l may include a plurality of micro-branch portion 194h and micro-branch portion 194l.

The pixel electrode 191 may be divided into four sub-regions by the horizontal stem portions 193h and 193l and the vertical stem portions 192h and 192l. Micro-branch portions 194h and 194l may obliquely extend from the horizontal stem portions 19hl and 193l and the vertical stem portions 192h and 192l, and the extension direction may form an angle of approximately 45° or 135° with the gate line 121 or the horizontal stem portions 193h and 193l. Further, the directions in which the micro-branch portions 194h and 194l in two adjacent sub-regions extend may be orthogonal to each other. In exemplary embodiments, the first sub-pixel electrode 191h and the second sub-pixel electrode 191l may further include outer stem portions surrounding outer sides of the first sub-pixel PXa and the second sub-pixel PXb, respectively.

The disposition form of the pixels, the structure of the thin film transistors, and the shape of the pixel electrodes described above are but examples, and, in this manner, exemplary embodiments are not limited thereto, and various modifications are not only feasible, but contemplated.

The common electrode 270 may be formed on the pixel electrode 191 to be spaced apart from the pixel electrode 191 by a predetermined distance. The microcavities 305 may be formed between the pixel electrode 191 and the common electrode 270. In this manner, the microcavities 305 may be surrounded by the pixel electrode 191 and the common electrode 270. The common electrode 270 may be formed in the row direction and may be disposed on the microcavities 305 and in the second valleys V2. The common electrode 270 may be formed to cover top and side surfaces of the microcavities 305. A width and an area of the microcavities 305 may be variously modified according to a size and resolution of the display device.

In each pixel PX, the common electrode 270 may be formed to be separated from the substrate 110 to form the microcavities 305, but in the second valleys V2, the common electrode 270 may be formed to be indirectly attached to the substrate 110. In the second valleys V2, the common electrode 270 may be formed immediately above the second insulating layer 250, e.g., the common electrode 270 may be disposed directly on the second insulating layer 250.

The common electrode 270 may be formed of any suitable transparent conductive material, such as, for example, aluminum zinc oxide (AZO), gallium zinc oxide (GZO), indium tin oxide (ITO), indium zinc oxide (IZO), etc. It is also contemplated that one or more conductive polymers (ICP) may be utilized, such as, for example, polyaniline (PANI), poly(3,4-ethylenedioxythiophene)poly(styrenesulfonate) (PEDOT:PSS), etc. A predetermined voltage may be applied to the common electrode 270, and an electric field may be formed between the pixel electrode 191 and the common electrode 270.

A first alignment layer 11 may be formed on the pixel electrode 191. The first alignment layer 11 may also be formed directly on the first insulating layer 240, which is not covered by the pixel electrode 191. A second alignment layer 21 may be formed under the common electrode 270 to face the first alignment layer 11. The first alignment layer 11 and the second alignment layer 21 may be formed as vertical alignment layers, and may be formed of any suitable alignment material, such as, for instance, polyamic acid, polysiloxane, polyimide, etc. The first and second alignment layers 11 and 21 may be connected to a side wall of the edges of the microcavities 305.

A liquid crystal layer formed of liquid crystal molecules 310 may be formed in the microcavities 305, which are positioned between the pixel electrode 191 and the common electrode 270. The liquid crystal molecules 310 may have negative dielectric anisotropy, and may be erected (e.g., aligned) in a vertical direction on the substrate 110 in a state when an electric field is not applied. In this manner, vertical alignment may be implemented.

The first sub-pixel electrode 191h and the second sub-pixel electrode 191l, to which the data voltage is applied, may generate an electric field together with the common electrode 270 to determine a direction of alignment of the liquid crystal molecules 310 disposed in the microcavities 305 between the two electrodes 191 and 270. Luminance of light passing through the liquid crystal layer may be changed according to the determined direction of the liquid crystal molecules 310.

A third insulating layer 350 may be further formed on the common electrode 270. The third insulating layer 350 may be formed of any suitable inorganic insulating material, such as, for instance, silicon nitride (SiNx), silicon oxide (SiOx), etc., and may be omitted.

A roof layer 360 may be formed on the second insulating layer 350. The roof layer 360 may be formed of any suitable material, such as an organic material. Roof layers 360 may be formed in a substantially vertical direction, and the microcavities 305 may be formed in the second valleys V2. The common electrode 270 may be formed to cover top and side surfaces of the microcavities 305. The roof layer 360 may be hardened by a hardening process to maintain the shape of the microcavities 305. In this manner, the roof layer 360 may be formed to be spaced apart from the pixel electrode 191 with the microcavities 305 disposed therebetween.

The common electrode 270 and the roof layer 360 may be formed to expose the side surface of the edge of the microcavities 305, and portions where the microcavities 305 are not covered by the common electrode 270 and the roof layer 360 may be referred to as injection holes 307a and 307b. The injection holes 307a and 307b may include a first injection hole 307a through which a side surface of a first edge of the microcavities 305 may be exposed, and a second injection hole 307b through which a side surface of a second edge of the microcavities 305 may be exposed. The first edge and the second edge may face each other, and, for example, in a plan view, the first edge may be an upper edge of the microcavities 305 and the second edge may be a lower edge of the microcavities 305. The injection holes 307a and 307b may expose side surfaces of the edges of the microcavities 305, which may be adjacent to the first valleys V1. The microcavities 305 may be exposed by the injection holes 307a and 307b, so that an alignment solution, liquid crystal material, and/or the like, may be injected into the microcavities 305 through the injection holes 307a and 307b.

The common electrode 270 and the roof layers 360 may be formed to cover the remaining edges, except the edges in which the injection holes 307a and 307b are formed. In this manner, the common electrode 270 and the roof layers 360 may be formed to cover side surfaces of a left edge and a right edge of each of the microcavities 305. As such, partition walls 365 may be formed between the microcavities 305, and the partition walls 365 may serve as a part of the roof layers 360. The partition walls may be formed in the second valleys V2 to separate the adjacent microcavities 305 from each other.

A groove 1362 may be formed in a top surface of each of the roof layers 360. It is contemplated that the groove 1362 may be formed in a top surface of each of the partition walls 365 of the roof layers 360. In this manner, the groove 1362 may be formed at each of the second valleys V2. The partition walls 365 may be overlapped with the light blocking member 220 at each of the second valleys V2. As such, the grooves 1362 formed on the partition walls 365 may be overlapped with the corresponding light blocking member 220. When light passing through the microcavities 305 travels through the roof layers 360, distortion may be generated at portions at which the grooves 1362 are formed. In exemplary embodiments, however, because the grooves 1362 may be overlapped with the light blocking member 220, it may be possible to prevent distortion from being visible.

Each of the roof layers 360 may be formed of any suitable material, such as an organic film. When an organic film is formed and is subsequently subjected to a high-temperature back-end process, an outgassing phenomenon may be generated in the organic film, which may be seen as a stain when viewing an image displayed via the display device. In exemplary embodiments, however, the grooves 1362 may be formed in the roof layers 360, and thus, a solvent remaining in the organic film may be removed through the grooves 1362, which may prevent (or otherwise reduce) the outgassing phenomenon.

The grooves 1362 may be formed to have a circular planar shape. The grooves 1362 may be disposed between two microcavities 305 to be separated from each other at a predetermined interval. However, the planar shape of the grooves 1362 may be formed in various shapes without being limited to the circular shape. The grooves 1362 may be formed to have different planar shapes. Each of the grooves 1362 may have a flat bottom surface and a side wall that is inclined. However, the cross-sectional shape of the grooves 1362 is not limited thereto. For instance, the bottom surface may be curved, and the side wall may be formed at a right angle. The cross-sectional shape of the grooves 1362 may also be formed to have an arc-like (e.g., arcuate) shape.

A fourth insulating layer 370 may be formed on the roof layer 360. The fourth insulating layer 370 may be made of any suitable material, such as, for example, an inorganic insulating material, e.g., silicon nitride (SiNx), silicon oxide (SiOx), etc. The fourth insulating layer 370 may be formed to cover the top and the side of the roof layer 360. The fourth insulating layer 370 may serve to protect the roof layer 360, which may be made of an organic material, and may be omitted if necessary.

The fourth insulating layer 370 may be removed at portions of the roof layers 360 at which the grooves 1362 are formed. As described above, the solvent remaining in the roof layers 360 may be removed through the grooves 1362 that may be formed in the roof layers 360. In this manner, if the fourth insulating layer 370 is formed in the grooves 1362, the removal of the solvent may not be easily performed. In exemplary embodiments, the fourth insulating layer 370 may be removed at the places where the grooves 1362 are formed, so the solvent remaining in the roof layers 360 may be easily removed through the grooves 1362.

An encapsulation layer 390 may be formed on the fourth insulating layer 370. The encapsulation layer 390 may be formed to cover the injection holes 307a and 307b where the microcavities 305 may be partially exposed to the outside. It is contemplated that the encapsulation layer 390 may seal the microcavities 305 so that the liquid crystal molecules 310 formed in the microcavities 305 may not be discharged to the outside. Since the encapsulation layer 390 contacts the liquid crystal molecules 310, the encapsulation layer 390 may be made of a material that does not react with the liquid crystal molecules 310. For example, the encapsulation layer 390 may be made of parylene, or any other suitable material.

The encapsulation layer 390 may be formed as a multilayer structure, e.g., such as a double layer and a triple layer structure, however, any suitable number of layers may be provided in association with exemplary embodiments described herein. The double layer may be configured by two layers made of different materials. The triple layer may be configured by three layers, and materials of adjacent layers may be different from each other. For example, the encapsulation layer 390 may include a layer made of an organic insulating material and a layer made of an inorganic insulating material.

Although not illustrated, polarizers may also be formed on the upper and lower sides of the display device. The polarizers may be configured by a first polarizer and a second polarizer. The first polarizer may be coupled to the lower surface of the substrate 110, and the second polarizer may be coupled to the encapsulation layer 390.

A display device according to exemplary embodiments will be described with reference to FIGS. 6 and 7. It is noted, however, that the display device of FIGS. 6 and 7 is substantially similar to the display device of FIGS. 1-5, and, therefore, duplicative descriptions will be avoided.

Figure 6:
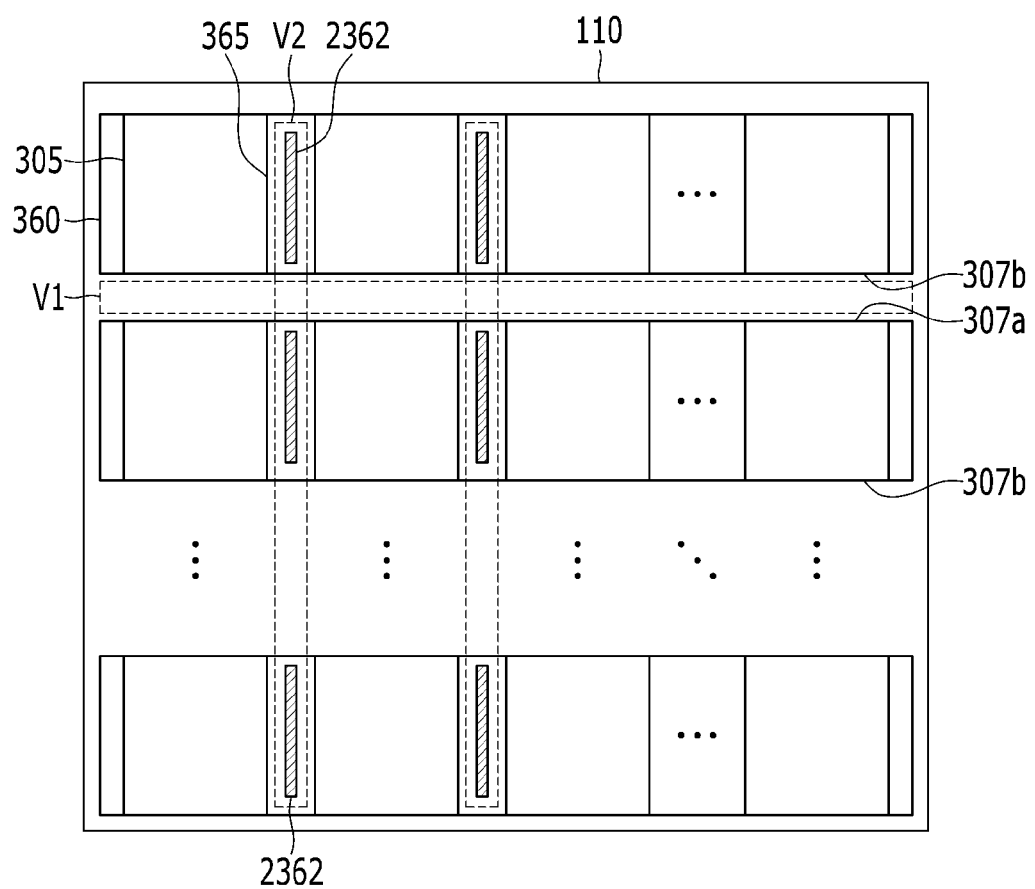
FIG. 6 is a plan view of a display device, according to exemplary embodiments.

FIG. 6 is a plan view of a display device, according to exemplary embodiments. FIG. 7 is a plan view of a pixel of the display device of FIG. 6.

Figure 7:
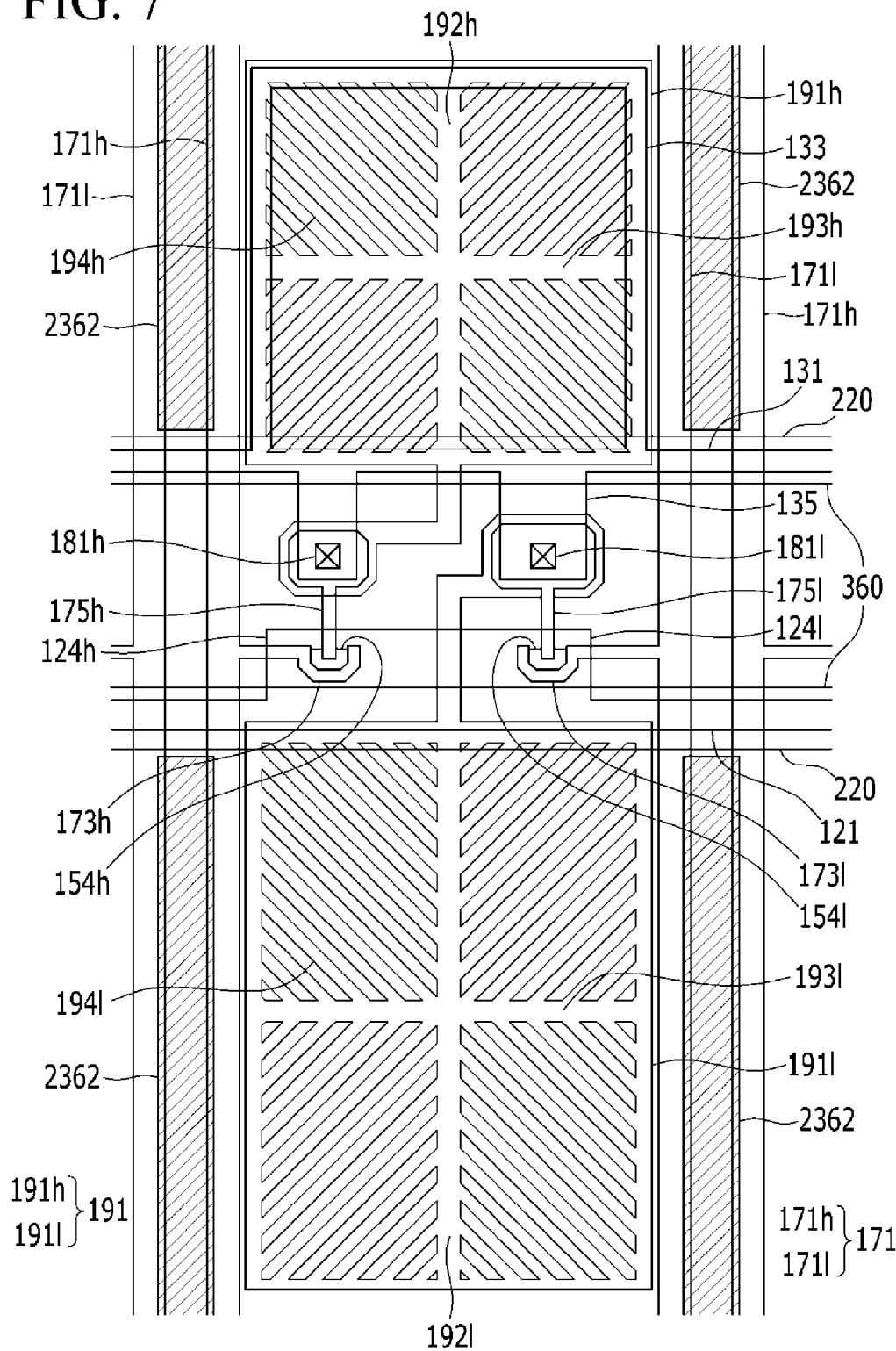
FIG. 7 is a plan view of a pixel of the display device of FIG. 6, according to exemplary embodiments.

As seen in FIGS. 6 and 7, microcavities 305 covered by roof layers 360 may be formed on the substrate 110, and the roof layers 360 may include partition walls 365 that may be formed between the microcavities 305.

Grooves 2362 may be formed in a top surface of each of the roof layers 360. The grooves 2362 may be formed in a top surface of each of the partition walls 365 of the roof layers 360. The grooves 2362 may have a bar-like planar shape. The grooves 2362 may have a bar-like planar shape that is extended in a direction that is parallel with the second valleys V2. The microcavities 305 may be arranged such that one groove 2362 is disposed between two microcavities 305. However, exemplary embodiments are not limited thereto. It is also contemplated that the microcavities 305 may be arranged such that two or more grooves 2362 may be disposed between two microcavities 305 to be separated from each other at predetermined intervals.

A display device according to exemplary embodiments will be described with reference to FIGS. 8 and 9. It is noted, however, that the display device of FIG. 8 and is substantially similar to the display device of FIGS. 1-5, and, therefore, duplicative descriptions will be avoided.

Figure 8:
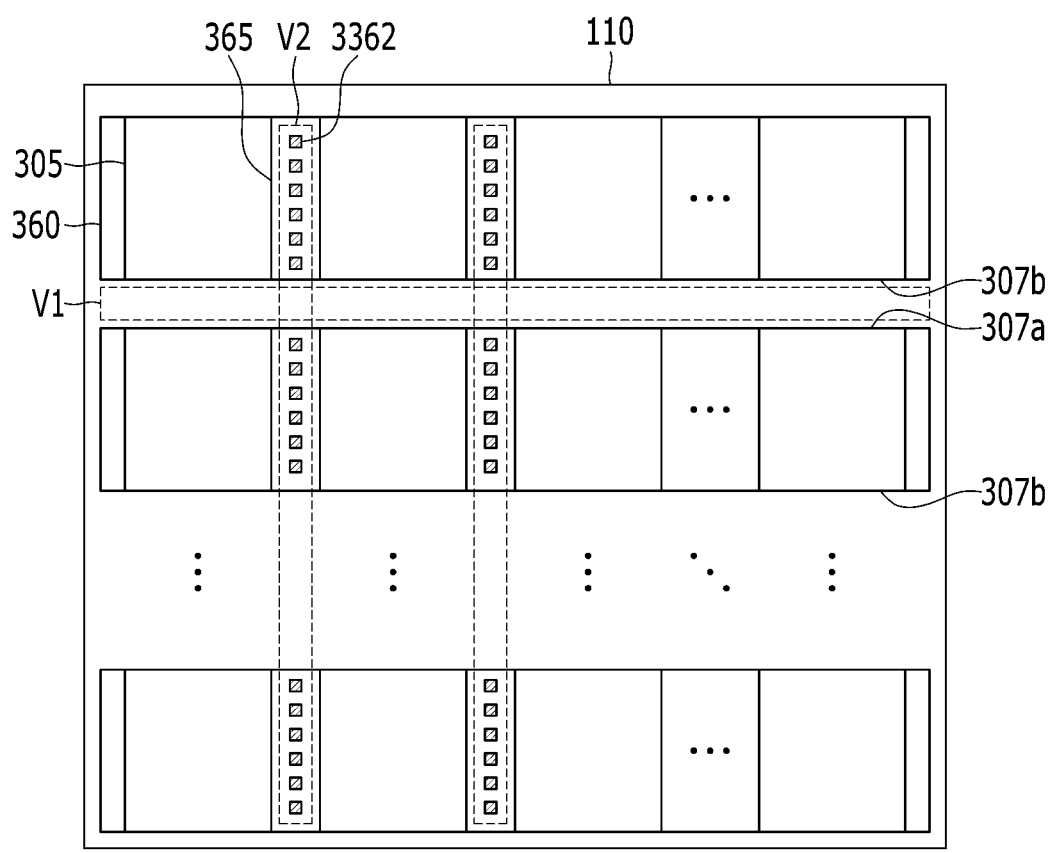
FIG. 8 is a plan view of a display device, according to exemplary embodiments.

FIG. 8 is a plan view of a display device, according to exemplary embodiments. FIG. 9 is a plan view of a pixel of the display device of FIG. 9.

Figure 9:
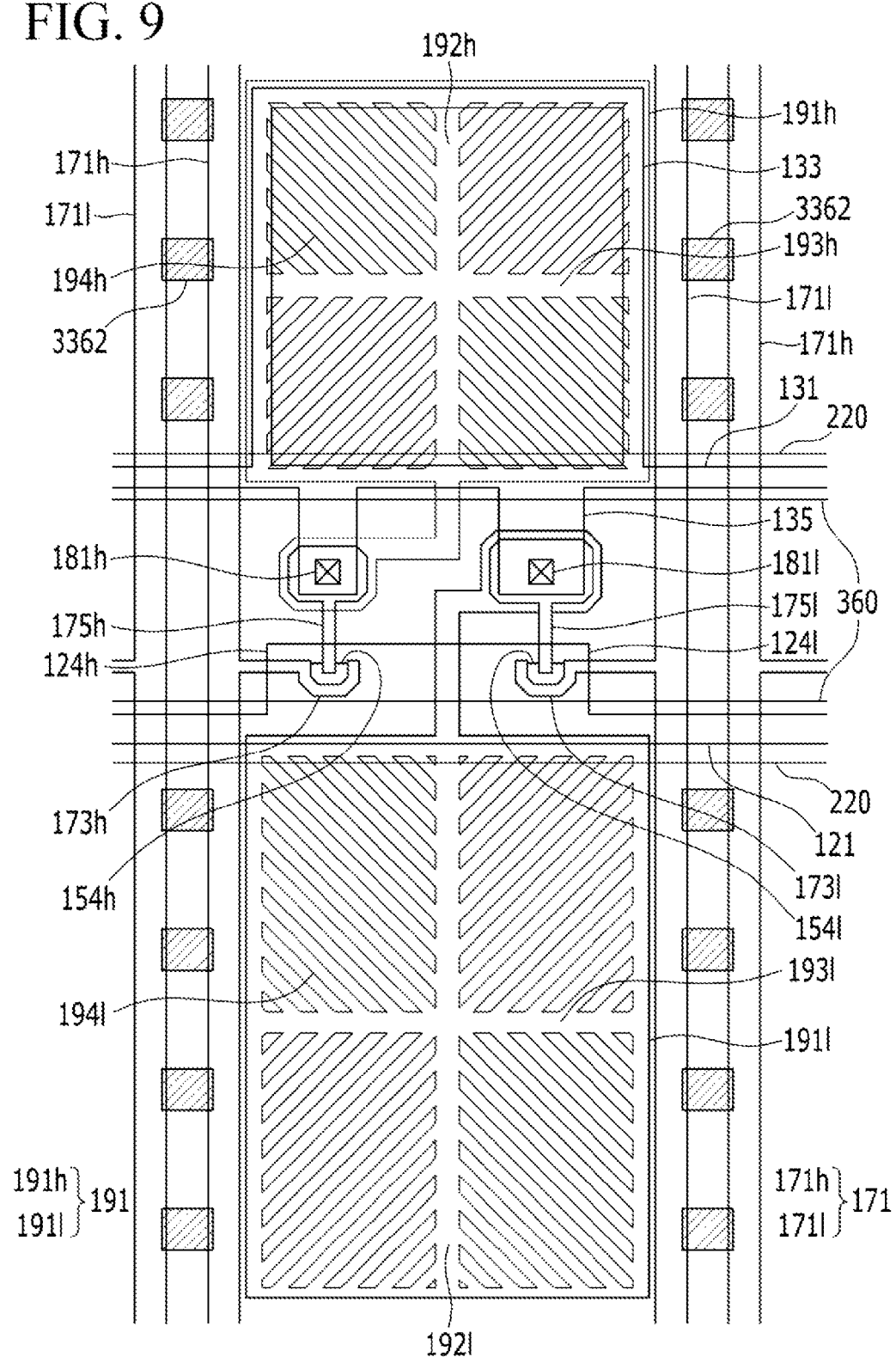
FIG. 9 is a plan view of a pixel of the display device of FIG. 9, according to exemplary embodiments.

As seen in FIGS. 8 and 9, the microcavities 305 covered by roof layers 360 may be formed on the substrate 110, and the roof layers 360 may include partition walls 365 that are formed between the microcavities 305. Grooves 3362 may be formed in a top surface of each of the roof layers 360. The grooves 3362 may be formed in a top surface of each of the partition walls 365 of the roof layers 360. The grooves 3362 may have a quadrangular planar shape. The grooves 3362 may be formed to have a square or rectangular shape. The microcavities 305 may be arranged such that two or more grooves 3362 may be disposed between two microcavities 305 to be separated from each other at predetermined intervals.

Figure 10:
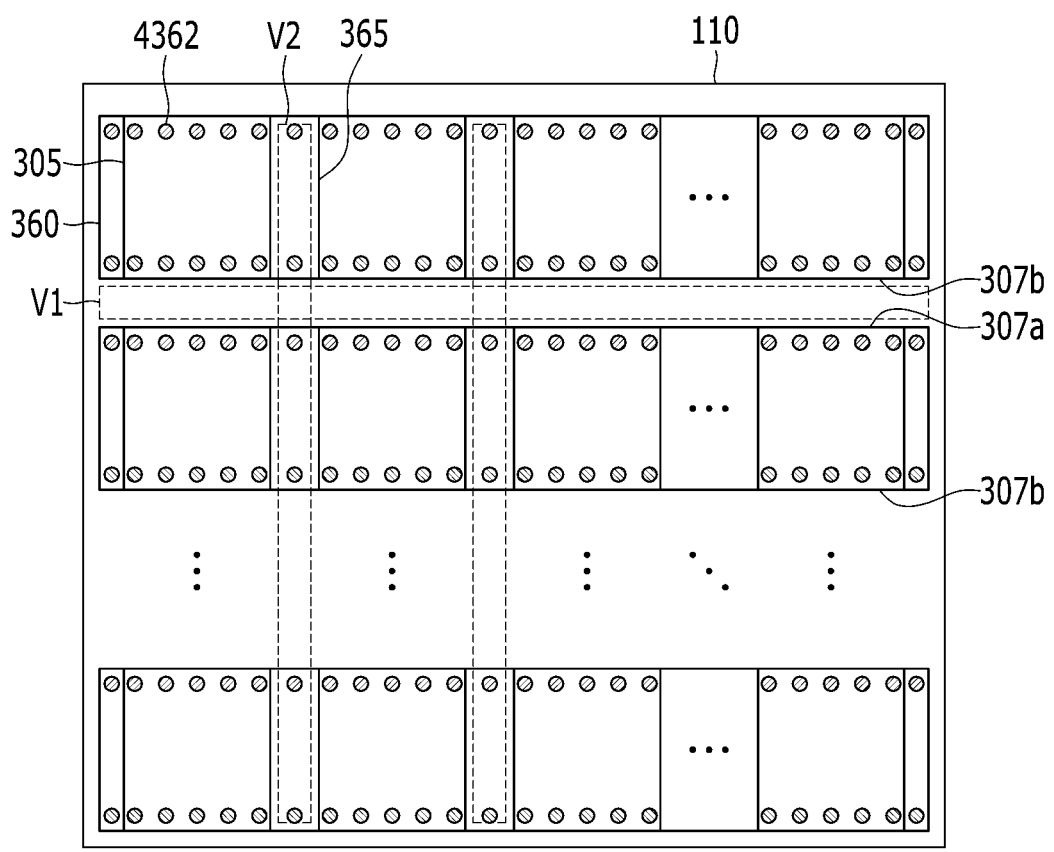
FIG. 10 is a plan view of a display device, according to exemplary embodiments.
Figure 11:
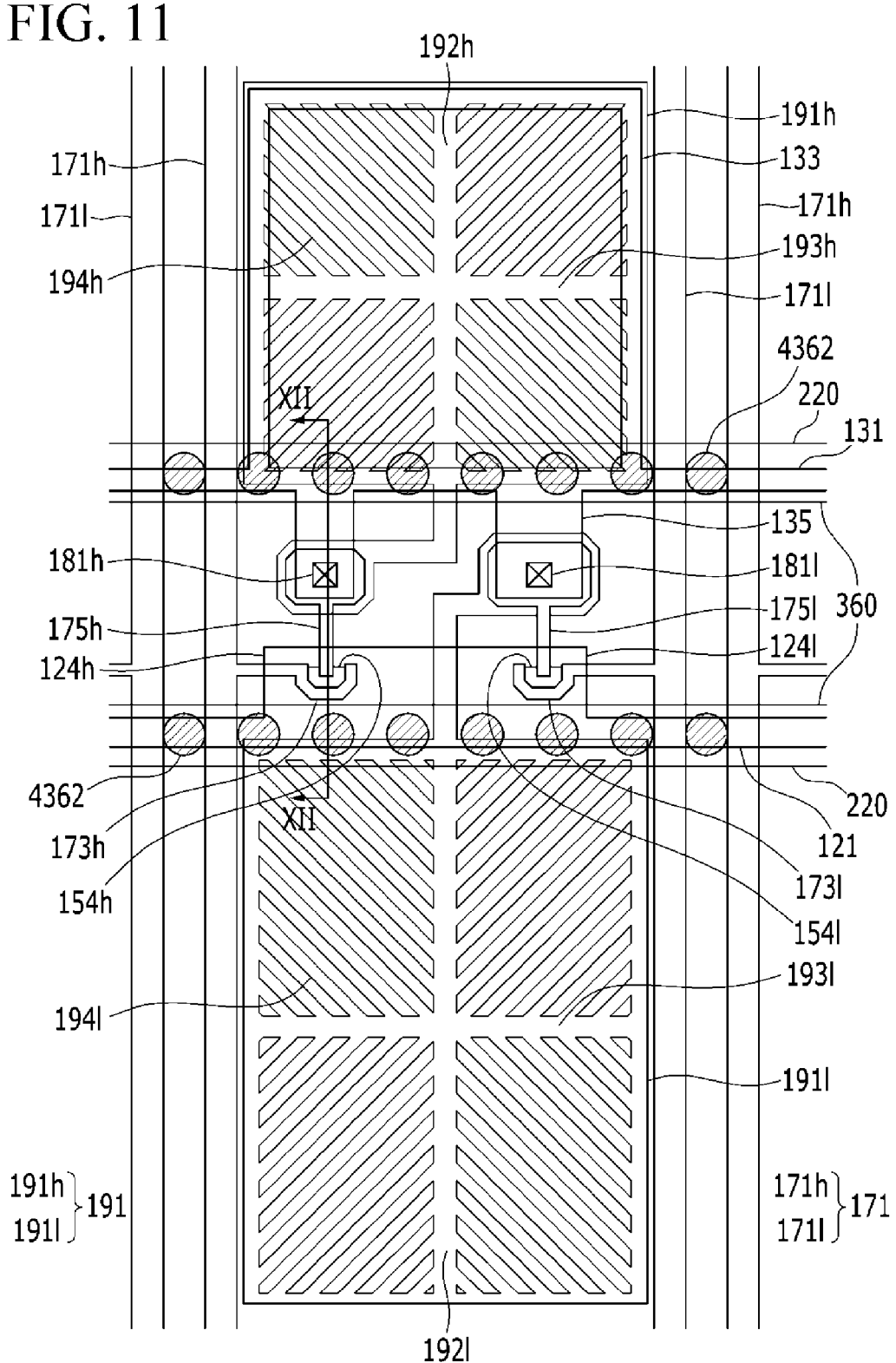
FIG. 11 is a plan view of a pixel of the display device of FIG. 10, according to exemplary embodiments.
Figure 12:
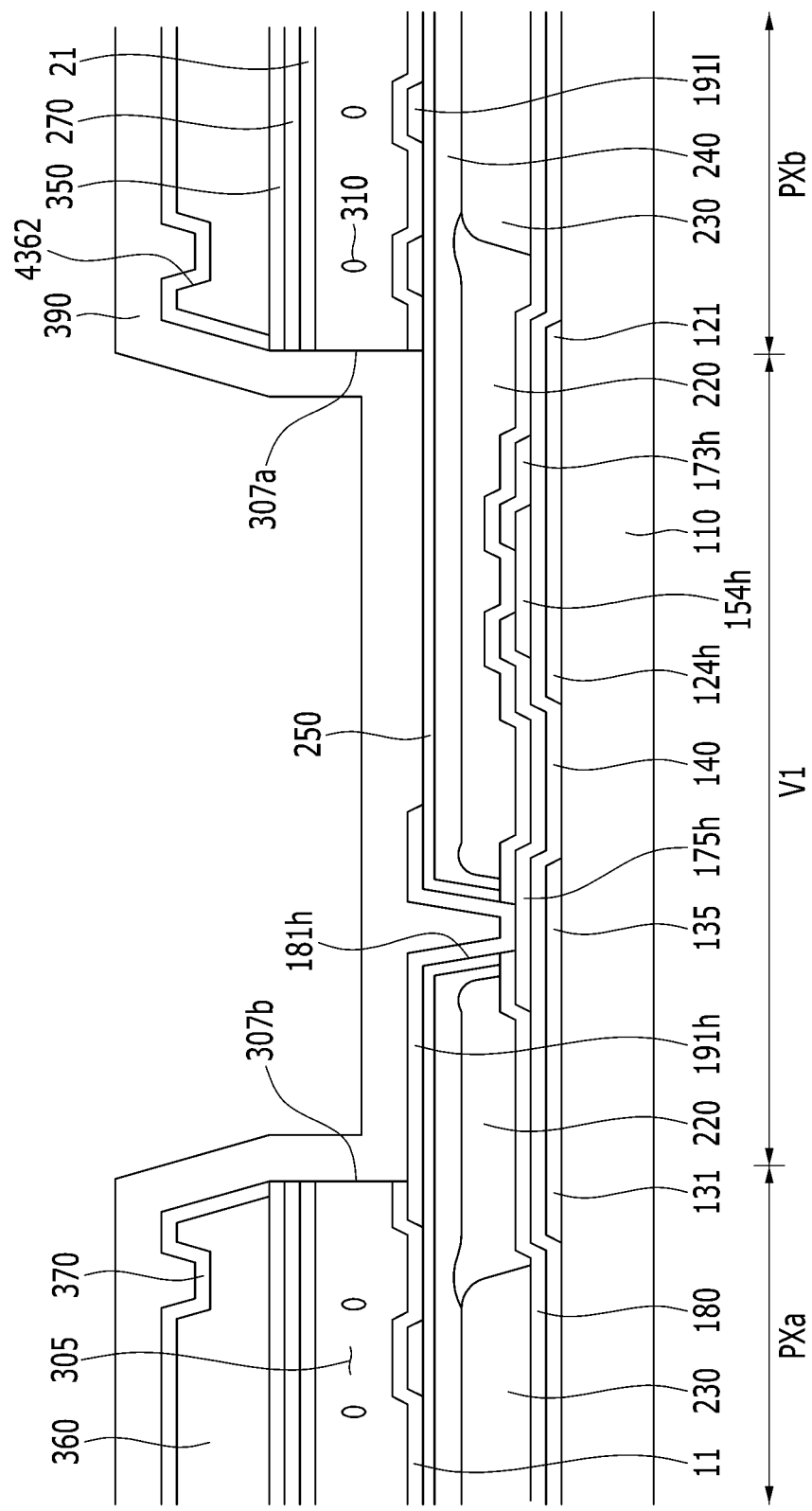
FIG. 12 is a cross-sectional view of the display device of FIG. 11 taken along sectional line XII-XII, according to exemplary embodiments.

A display device will be described with reference to FIGS. 10-12. The display device of FIGS. 10-12 is substantially similar to the display device of FIGS. 1-5, and, therefore, duplicative descriptions will be avoided. It is generally noted, however, that the grooves in FIGS. 10-12 are disposed in different positions than the grooves in FIGS. 1-5. This position is described in more detail below.

FIG. 10 is a plan view of a display device, according to exemplary embodiments. FIG. 11 is a plan view of a pixel of the display device FIG. 10. FIG. 12 is a cross-sectional view of the pixel of FIG. 11 taken along sectional line XII-XII.

Microcavities 305 covered by roof layers 360 may be formed on the substrate 110, and the roof layers 360 may be removed in the first valleys V1. The light blocking member 220 may be formed in the first valleys V1 and the second valleys V2, and may also be formed at edges of the pixels that are adjacent to the first valleys V1. In this manner, the light blocking member 220 may be overlapped with edges of the roof layers 360 that are adjacent to the first valleys V1. The injection holes 307a and 307b may be formed to expose side surfaces of edges of the microcavities 305, which are adjacent to the first valleys V1, and edges of the roof layers 360 that are adjacent to the injection holes 307a and 307b may be overlapped with the light blocking members 220.

Grooves 4362 may be formed in a top surface of each of the roof layers 360, and may be overlapped with the edges of the roof layers 360. The grooves 4362 may be formed in a top surface of each edge of the roof layers 360 which are adjacent to the injection holes 307a and 307b. In this manner, the grooves 4362 may be overlapped with the corresponding light blocking member 220. When light passing through the microcavities 305 travels through the roof layers 360, distortion may be generated at portions where the grooves 4362 may be formed. For example, because the grooves 4362 may be overlapped with the light blocking member 220, distortion may be prevented from being visible.

As seen in FIGS. 10 and 11, the grooves 4362 are illustrated to have a circular planar shape, but exemplary embodiments are not limited thereto. As described with reference to FIGS. 6 and 8, the grooves 4362 may have a bar-like or quadrangular shape, or any other suitable planar shape.

A method of manufacturing the display device will be described with reference to FIGS. 6-13. The method will also be described by referring to FIGS. 1-5.

Figure 13:
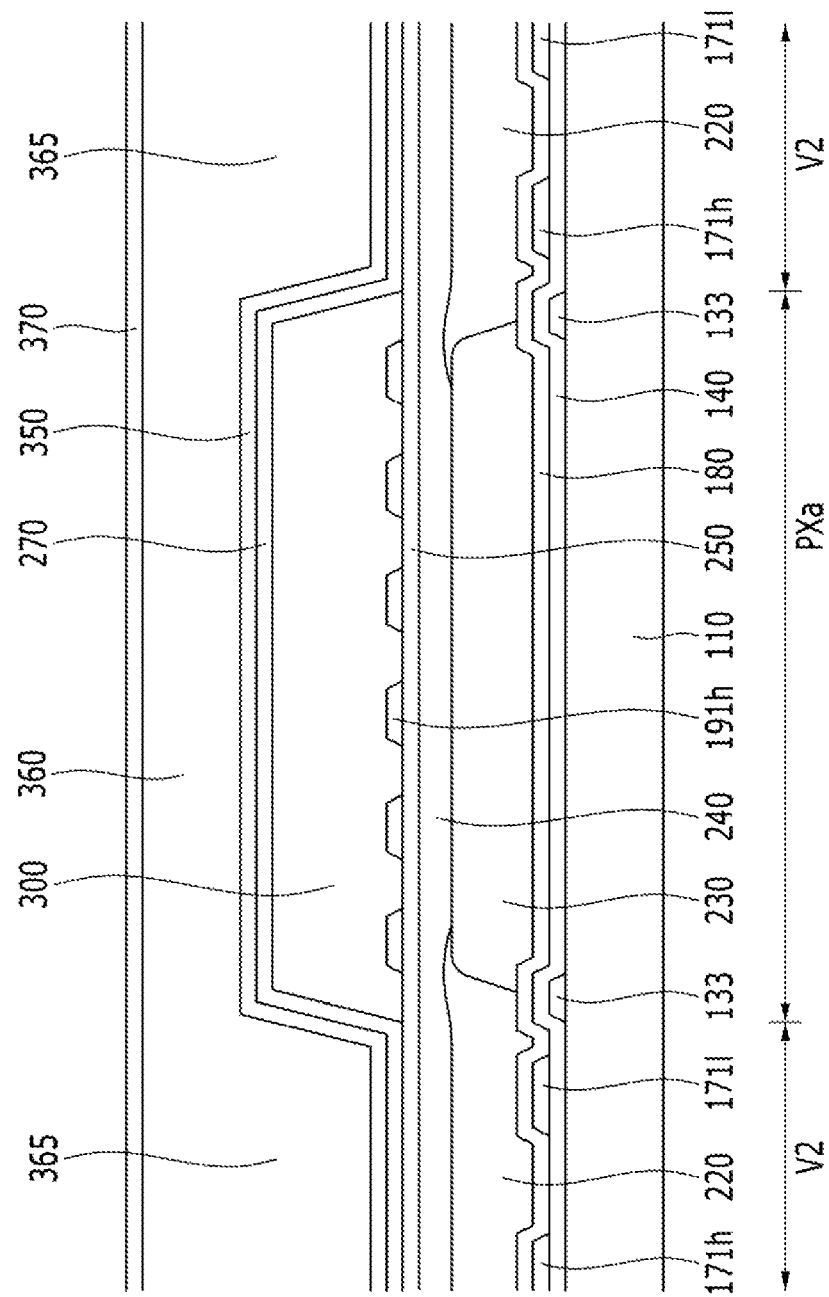
FIG. 13, FIG. 14, and FIG. 15 are respective cross-sectional views of a display device at various stages of manufacture, according to exemplary embodiments.
Figure 14:
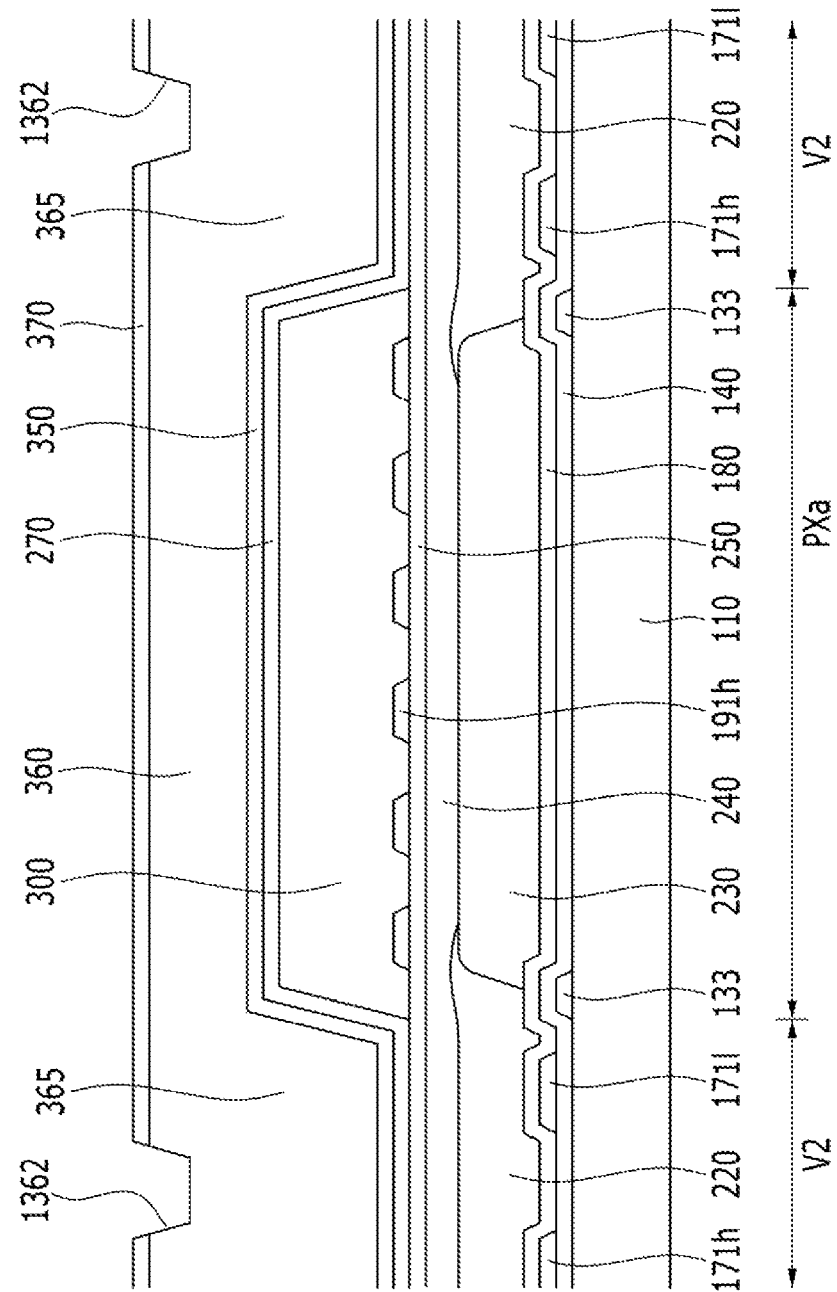
Figure 15:
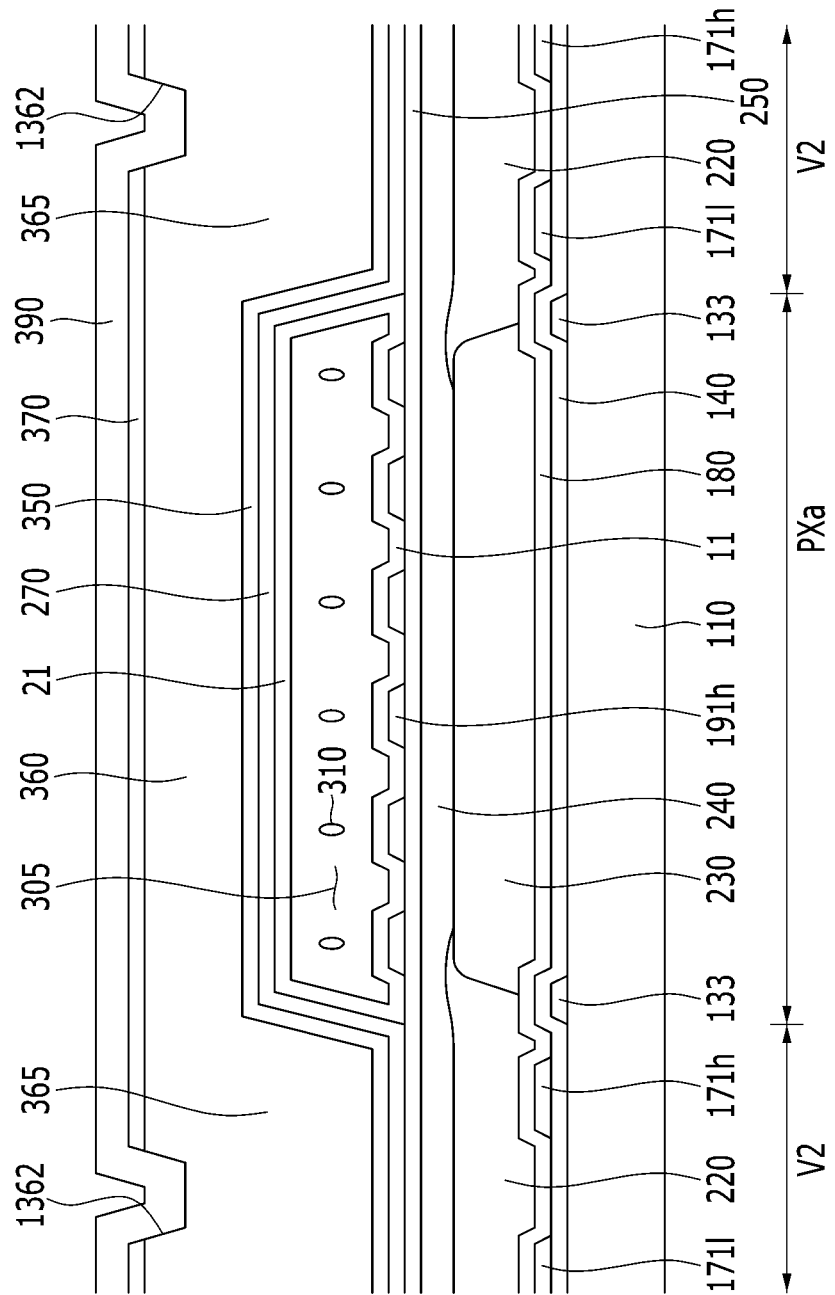

FIG. 13, FIG. 14, and FIG. 15 are cross-sectional views of a display device at various stages of manufacture, according to exemplary embodiments.

As shown in FIG. 13, a gate line 121 extending in a first direction, and a first gate electrode 124h and a second gate electrode 124l protruding from the gate line 121, may be formed on a substrate 110 made of glass or plastic. The first gate electrode 124h and the second gate electrode 124l may be connected to each other, forming one protrusion.

A storage electrode line 131 separated from the gate line 121 and storage electrodes 133 and 135 protruding from the storage electrode line 131 may be formed together. The storage electrode line 131 may extend parallel to the gate line 121. The storage electrode 133 protruding above the storage electrode line 131 may be formed to surround an edge of a first sub-pixel area PXa, and the storage electrode 135 protruding below the storage electrode line 131 may be formed adjacent to the first gate electrode 124h and the second gate electrode 124l.

The storage electrode 133 protruding above the storage electrode line 131 may be formed to surround an edge of a first sub-pixel area PXa, and the storage electrode 135 protruding below the storage electrode line 131 may be formed adjacent to the first gate electrode 124h and the second gate electrode 124l. The gate insulating layer 140 may be formed as a single layer or a multiple layer.

A first semiconductor 154h and a second semiconductor 154l may be formed by depositing and then patterning a semiconductor material such as amorphous silicon, polycrystalline silicon, and a metal oxide on the gate insulating layer 140. The first semiconductor 154h may be formed to be positioned on the first gate electrode 124h, and the second semiconductor 154l may be formed to be positioned on the second gate electrode 124l.

A first data line 171h and a second data line 171l extending in the second direction may be formed by depositing and then patterning a metal material. The metal material may be formed as a single layer or a multiple layer.

A first source electrode 173h protruding above the first gate electrode 124h from the first data line 171h, and a first drain electrode 175h spaced apart from the first source electrode 173h may be formed together. In addition, a second source electrode 173l protruding above the second gate electrode 124l from the second data line 171l and a second drain electrode 715l spaced apart from the second source electrode 173l may be formed together.

The first and second semiconductors 154h and 154l, the first and second data lines 171h and 171l, the first and second source electrodes 173h and 173l, and the first and second drain electrodes 175h and 715l may be formed by sequentially depositing and then simultaneously patterning a semiconductor material and a metal material. In this manner, the first semiconductor 154h may be formed below the first data line 171h, and the second semiconductor 154l may be formed below the second data line 171l.

The first and second gate electrodes 124h and 124l, the first and second source electrodes 173h and 173l, and the first and second drain electrodes 175h and 715l may form first and second thin film transistors (TFTs) Qh and Ql together with the first and second semiconductors 154h and 154l, respectively.

A passivation layer 180 may be formed on the first data line 171h, the second data line 171l, the first source electrode 173h, the first drain electrode 175h, the first semiconductor 154h exposed between the first source electrode 173h and the first drain electrode 175h, the second source electrode 173l, the second drain electrode 715l, and the second semiconductor 154l exposed between the second source electrode 173l and the second drain electrode 715l. The passivation layer 180 may be made of an organic insulating material or an inorganic insulating material, and may be formed as a single layer or a multiple layer.

A color filter 230 may be formed on the passivation layer 180. The color filter 230 may be formed within the first sub-pixel PXa and the second sub-pixel PXb, and may not be formed at the first valleys V1. Color filters 230 of the same color may be formed according to the column direction of the plurality of pixel areas PX. For example, when forming the color filter 230 of three colors, the first color filter 230 may be formed and then the color filter 230 of the second color may be formed by shifting a mask. After forming the second color filter 230, the third color filter 230 may be formed by shifting the mask again.

The light blocking member 220 may be formed on a switching element and a boundary of each pixel PX on the passivation layer 180 by using a light blocking material. The light blocking member 220 may be formed at the first valleys V1 and second valleys V2. The thin film transistors Qh and Ql may be positioned in the first valley V1, and the light blocking member 220 may be formed to overlap the thin film transistors Qh and Ql. The light blocking member 220 may be formed to overlap the gate line 121, the storage electrode line 131, and the data line 171.

The first insulating layer 240 may be further formed on the color filter 230 and the light blocking member 220 by using an organic insulating material, and the second insulating layer 250 may be formed on the first insulating layer 240 by using an inorganic insulating material.

The passivation layer 180, the first insulating layer 240, and the second insulating layer 250 may be patterned to form a first contact hole 181h exposing at least a portion of the first drain electrode 175h and a second contact hole 181l exposing at least a portion of the second drain electrode 715l.

A transparent metal material such as ITO or IZO may be deposited and patterned on the second insulating layer 250 to form a pixel electrode 191 in the pixel area PX. The pixel electrode 191 may include a first sub-pixel electrode 191h positioned in the first sub-pixel area PXa, and a second sub-pixel electrode 191l positioned in the second sub-pixel area PXb. The first sub-pixel electrode 191h and the second sub-pixel electrode 191l may be separated from each other by a first valley V1.

Horizontal stem portions 193h and 193l and vertical stem portions 192h and 192l crossing the horizontal stem portions 193h and 193l may be formed in the first sub-pixel electrode 191h and the second sub-pixel electrode 191l, respectively. Further, a plurality of minute branches 194h and 194l, which may obliquely extend from the horizontal stem portions 193h and 193l and the vertical stem portions 192h and 192l, may be formed.

A sacrificial layer 300 may be formed on the pixel electrode 191 and the first insulating layer 240. The sacrificial layer 300 may be formed in a column direction. The sacrificial layer 300 may be formed in each pixel PX and the first valleys V1, but may not be formed in the second valleys V2.

A common electrode 270 may be formed by depositing a transparent metal material such as indium tin oxide (ITO) and indium zinc oxide (IZO) on the sacrificial layer 300.

A second insulating layer 350 may be formed on the common electrode 270 with an inorganic insulating material such as a silicon nitride, a silicon oxide, and a silicon oxynitride.

The roof layer 360 may be formed by coating an organic material on the third insulating layer 350 and performing patterning on the roof layer 360. For example, the patterning may be performed to remove a portion of the organic material which is positioned at the first valleys V1. In this manner, the roof layer 360 may be formed in such a shape that the roof layer 360 may be connected along a plurality of pixel rows.

The common electrode 270 and the roof layers 360 may be formed to cover side surfaces of a left edge and a right edge of each of the microcavities 305. To this end, the partition walls 365 may be formed between the microcavities 305, and the partition walls 365 may serve as a part of the roof layers 360. The partition walls 365 may be formed at the second valley V2 to separate the adjacent microcavities 305 from each other.

The roof layers 360 may be patterned, and then subjected to a hardening process at a temperature of about 110° C. by irradiating light. The hardening process may make the roof layers 360 hardened. In this manner, even when a space is generated below the roof layers 360, the shape of the roof layers 360 may be maintained. Even after the hardening process is performed, the solvent may remain in the roof layers 360.

The third insulating layer 350 and the common electrode 270 may then be patterned by using the roof layer 360 as a mask to remove the portions of the third insulating layer 350 and the common electrode 270 that may be positioned at the first valleys V1.

The fourth insulating layer 370 may be formed on the roof layer 360 by using an inorganic insulating material such as a silicon nitride (SiNx) and a silicon oxide (SiOx).

As shown in FIG. 14, the fourth insulating layer 370 may be patterned. The fourth insulating layer 370 formed at the second valleys V2 may be partially etched, and the fourth insulating layer 370 formed at the first valleys V1 may be etched. The portions of the fourth insulating layer 370 may be etched to have a circular planar shape at the second valleys V2. In the etching process of the fourth insulating layer 370, if the fourth insulating layer 370 is over-etched, the grooves 1362 may be formed in the roof layers 360. The planar shape of the grooves 1362 may be substantially the same as that of the etched portions of the fourth insulating layer 370 at the second valleys V2. The grooves 1362 may be formed to have a circular planar shape. The grooves 1362 are illustrated to have a circular planar shape, but exemplary embodiments are not limited thereto. As described above with reference to FIG. 6 and FIG. 8, the grooves 1362 may have a bar-like or quadrangular shape, or any other suitable planar shape.

The grooves 1362 are described to be formed in the roof layers 360 through the over-etching of the fourth insulating layer 370, but exemplary embodiments are not limited thereto. The fourth insulating layer 370 may be etched through a first etching process, and then the roof layers 360 may be etched to form the grooves 1362 through a second etching process that may be different from the first etching process.

The portion of the sacrificial layer 300 which is positioned at the first valleys V1 may be exposed to the outside by patterning the roof layer 360, the third insulating layer 350, the common electrode 270, and the fourth insulating layer 370.

As shown in FIG. 15, the sacrificial layer 300 may be removed by applying a developer or a stripper solution on the substrate 110 where the sacrificial layer 300 may be exposed, or the sacrificial layer 300 may be removed by using an ashing process.

When the sacrificial layer 300 is removed, the microcavities 305 may be generated at a portion where the sacrificial layer 300 is positioned.

The pixel electrode 191 and the roof layer 360 may be spaced apart from each other with the microcavities 305 between the pixel electrode 191 and the roof layer 360. The common electrode 270 and the roof layer 360 may be formed to cover the upper surface and opposite side surfaces of the microcavities 305.

The microcavities 305 may be exposed to the outside through portions where the roof layer 360 and the common electrode 270 are removed, which may be injection holes 307a and 307b. When an aligning agent containing an alignment material is dripped on the substrate 110 by a spin coating method or an inkjet method, the aligning agent may be injected into the microcavities 305 through the injection holes 307a and 307b. When the aligning agent is injected into the microcavities 305 and then a curing process is performed, a solution component may be evaporated and the alignment material may remain at an inner wall of the microcavities 305. In this manner, a first alignment layer 11 may be formed on the pixel electrode 191, and a second alignment layer 21 may be formed below the common electrode 270. The first alignment layer 11 and the second alignment layer 21 may be formed to face each other with the microcavities 305 between the first alignment layer 11 and the second alignment layer 21, and to be connected to each other at the side wall of the edge of the microcavities 305. For example, the first alignment layer 11 and second alignment layers 21 may be aligned in a direction perpendicular to the substrate 110 except at the side surface of the microcavities 305.

When a liquid crystal material is dripped on the substrate 110 by an inkjet method or a dispensing method, the liquid crystal material may be injected into the microcavities 305 through the injection holes 307a and 307b.

The encapsulation layer 390 may be formed by depositing a material which does not react with the liquid crystal molecules 310 on the fourth insulating layer 370. The encapsulation layer 390 may be formed to cover the injection holes 307a and 307b, sealing the microcavities 305 so that the liquid crystal molecules 310 formed in the microcavities 305 may not be discharged to the outside.

Although not illustrated, polarizers may be further attached onto the upper and lower surfaces of the display device. The polarizers may include a first polarizer and a second polarizer. The first polarizer may be attached onto the lower surface of the substrate 110, and the second polarizer may be attached onto the encapsulation layer 390.

After the roof layers 360 are formed, a hardening process at a temperature of about 200° C. or higher may be performed before the encapsulation layer 390 is formed. For example, an outgassing phenomenon may be generated in the roof layers 360 each of which is formed of an organic film by the solvent, which may be seen as a stain. The grooves 1362 may be formed in the roof layers 360, and the fourth insulating layer 370 may not be covered on the grooves 1362. In this manner, when the high-temperature hardening process is performed on the organic films, the solvent remaining in the organic films may be removed through the grooves 1362, preventing the outgassing phenomenon.

The grooves 1362 are illustrated to be formed at the second valleys V2, but exemplary embodiments are not limited thereto. As shown in FIG. 10, the grooves 1362 may be formed in edges of the roof layers 360 that are adjacent to the injection holes 307a and 307b. In this manner, the grooves 1362 of the roof layers 360 may be formed in such a way to be overlapped with the corresponding light blocking member 220.

In the patterning process of the fourth insulating layer 370, the grooves 1362 may be formed in the roof layers 360 that may be disposed below portions at which the fourth insulating layer 370 may be formed. In this manner, the position and shape of the grooves 1362 may be determined by controlling the patterning of the fourth insulating layer 370.

Although certain exemplary embodiments and implementations have been described herein, other embodiments and modifications will be apparent from this description. Accordingly, the inventive concept is not limited to such embodiments, but rather to the broader scope of the presented claims and various obvious modifications and equivalent arrangements.

What is claimed is:

1. A display device, comprising:
   a substrate;
   a thin film transistor disposed on the substrate;
   a pixel electrode connected to the thin film transistor;
   a roof layer disposed on the pixel electrode, the roof layer covering microcavities;
   a groove formed in the roof layer, the groove extending into a portion of the roof layer disposed between the microcavities;
   liquid crystal molecules disposed in the microcavities; and
   an encapsulation layer disposed on the roof layer and extending into the groove, the encapsulation layer sealing the liquid crystal molecules in the microcavities,
   wherein:
   the microcavities comprise an uppermost surface disposed furthest from the substrate; and
   a lowermost surface of the groove is disposed further from the substrate than the uppermost surface of the microcavities,
   wherein the roof layer comprises:
   a partition wall portion disposed between the microcavities; and
   an upper portion disposed on the partition wall portion, the partition wall portion being disposed between the upper portion and the substrate, and
   wherein the groove overlaps the partition wall portion.

2. The display device of claim 1, further comprising:
   a light blocking member overlapping the groove.

3. The display device of claim 1, wherein the groove overlaps an edge of the roof layer.

4. The display device of claim 3, wherein:
an injection hole in the roof layer exposes the microcavities; and
the groove is disposed adjacent to the injection hole.

5. The display device of claim 4, further comprising:
a light blocking member overlapping the groove.

6. The display device of claim 5, wherein the groove forms at least one of a circular planar shape, a quadrangular planar shape, and a bar-like planar shape.

7. The display device of claim 1, further comprising:
an insulating layer disposed on the roof layer,
wherein the insulating layer is removed at a portion corresponding to the groove.

8. The display device of claim 1, wherein the groove forms at least one of a circular planar shape, a quadrangular planar shape, and a bar-like planar shape.

* * * * *